UNITED STATES PATENT OFFICE.

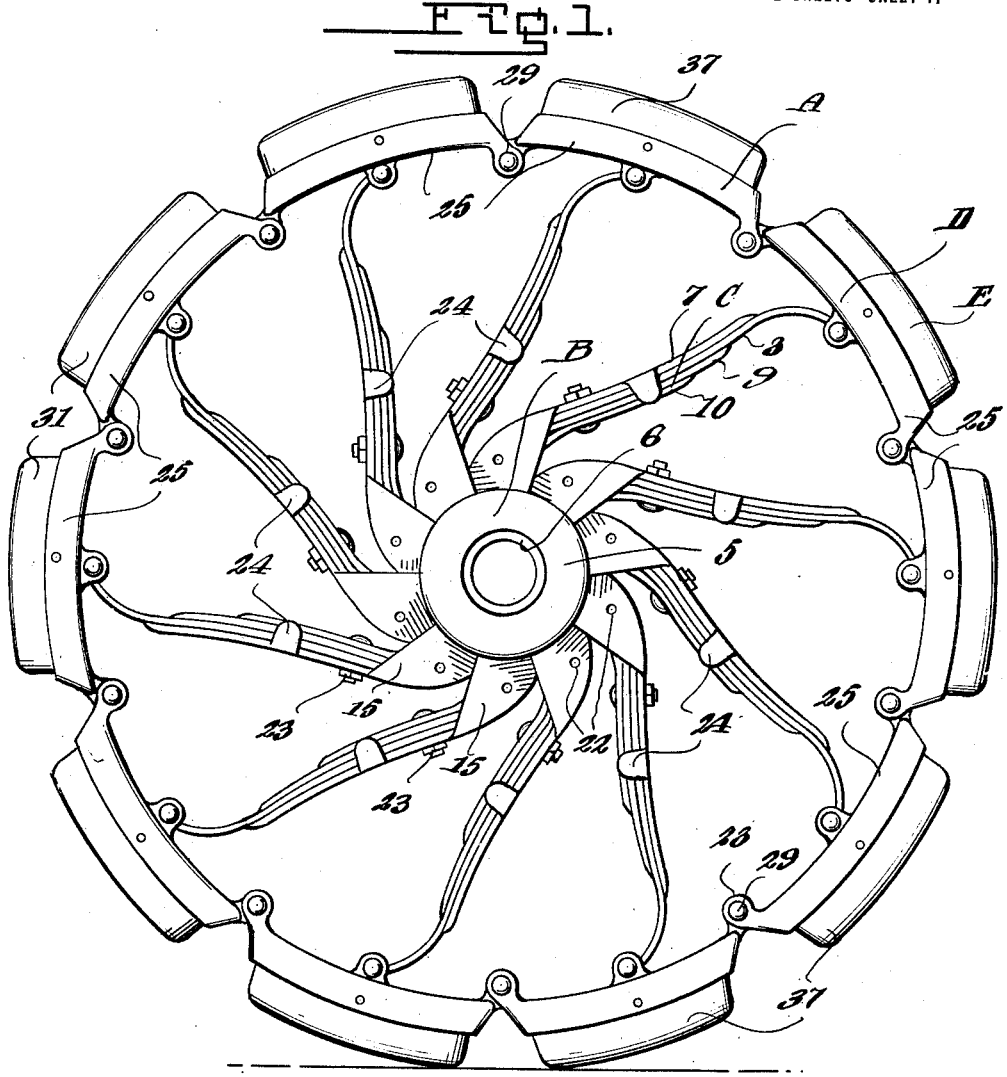

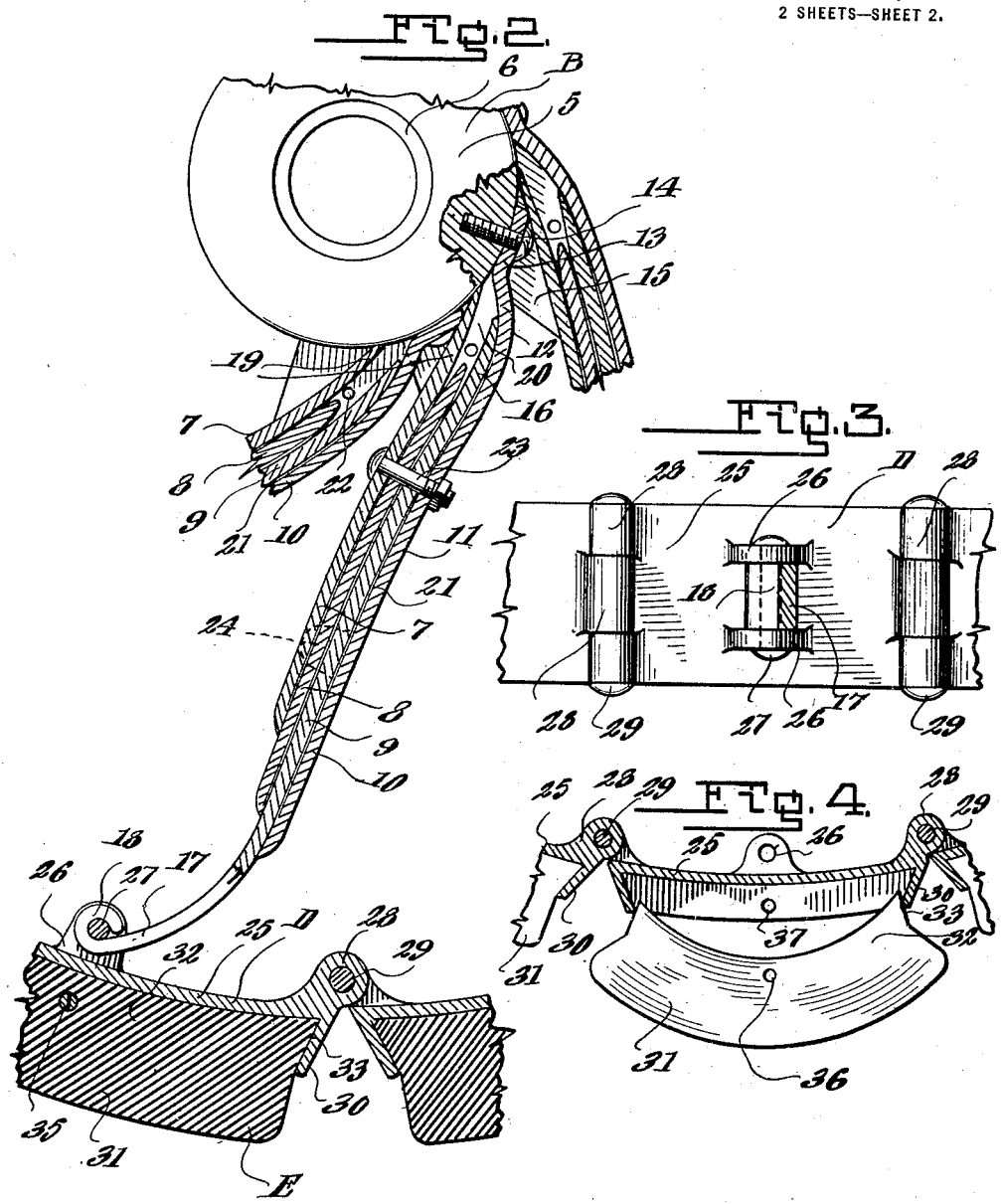

EARL AMOS DE BAUN, OF MINNEAPOLIS, MINNESOTA.

VEHICLE-WHEEL AND TIRE.

1,375,832.   Specification of Letters Patent.   Patented Apr. 26, 1921.

Application filed December 4, 1919. Serial No. 342,431.

*To all whom it may concern:*

Be it known that I, EARL AMOS DE BAUN, a citizen of the United States, residing at Minneapolis, in the county of Hennepin and State of Minnesota, have invented certain new and useful Improvements in Vehicle-Wheels and Tires, of which the following is a specification.

This invention relates to vehicle wheels, and the primary object of the invention is to provide an improved wheel especially adapted for use in connection with motor vehicles, which is so constructed, as to obviate the necessity of employing the usual pneumatic tire for absorbing the shocks of the road.

Another object of the invention is the provision of an improved vehicle wheel embodying a novel type of spring spokes tangentially connected to the hub of the wheel and pivotally connected to the rim, which includes a plurality of pivotally connected sections.

A further object of the invention is to provide a novel type of spring spokes for a vehicle wheel which includes a plurality of sections or leaves which are so connected and secured together in relation to one another, that maximum resiliency is obtained therefrom without the likelihood of breaking the same.

A further object of the invention is to provide a novel means for connecting the leaves of the spring spoke together so as to form an oil pocket in the inner terminal thereof, thereby permitting the lubrication of the leaves of the spoke at all times.

A further object of the invention is to provide an improved tire for the wheel which includes a plurality of flexible sections, which are adapted to be flexed into operative position in suitable sockets formed on the rim, the rim carrying means for preventing the reflexing of the sections to prevent accidental displacement thereof.

A still further object of the invention is the provision of an improved motor vehicle wheel of the above character which is durable and efficient in use, one that is simple and easy to manufacture, and one which can be placed upon the market at a reasonable cost.

Other objects of the invention will appear in the following detailed description, taken in connection with the drawings, forming a part of this specification, in which drawings:

Figure 1 is an elevation of the improved wheel.

Fig. 2 is an enlarged fragmentary longitudinal section through the same.

Fig. 3 is an enlarged fragmentary section through the improved wheel, showing a section of the rim, and Fig. 4 is an enlarged detail section through the tire and rim, showing the method of positioning one of the movable tire sections in position.

Referring to the drawings, in detail, wherein similar reference characters designate corresponding parts throughout the several views, the letter A indicates the improved vehicle wheel, which includes the hub B, a plurality of spring spokes C, the rim D, and the tire E.

The hub B includes an annular body 5 having the usual or any preferred axle box 6 arranged therein, and the outer surface of the body 5 is adapted to receive the spring spokes C.

The spring spokes C are arranged in tangential relation to the hub B and each includes a plurality of leaves 7, 8 and 9, and a reinforcing plate 10. The reinforcing plate 10 includes a flat elongated body 11 having its inner end bent inwardly toward the hub B as at 12 and provided with an attaching foot 13 which extends tangentially to the hub, and is secured to the same by suitable screws or other fastening elements 14. The side edges of the reinforcing plate 10 adjacent to the inner end thereof are provided with inwardly extending wings 15, which engage the periphery of the hub and form a housing for the inner ends of the leaves 7, 8 and 9. The leaf 9 is formed relatively thick and is arranged on the inner face of the reinforcing plate 10 and the inner terminal of the leaf 9 ends short of the inner terminal of the reinforcing plate, and the hub B. The inner end of the leaf 9 terminates within the wings 15 and is curved as at 16 to conform to the curved end 12 of the reinforcing plate 10. The outer end of the plate 9 is curved arcuately as at 17 and terminates in an attaching eye 18, which provides means whereby the spoke may be attached to the rim D. The leaf 8 is formed relatively short and is positioned on the inner face of the leaf 9 and terminates within the wings 15 formed on the reinforcing plate but short of the inner terminal of the leaf 9. The outer leaf 7 is positioned on the inner face of the leaf 8 and has the outer end thereof terminating short of the outer end of the leaf 8 and has its inner end curved, and extended into engagement with the hub B as at 19. The inner end of the leaf 7 extends into the wings 15 and forms in connection with the wings 15, the hub B, and the reinforcing plate 10, an oil reservoir or cup 20, for the leaves, and the leaves are provided with fine oil ways 21, which communicate with the oil reservoir or cup 20. The wings 15 are provided with suitable openings 22 so that the oil can be readily placed into the reservoir or cup. The reinforcing plate 10 and the leaves 7, 8 and 9 are secured to each other by suitable detachable bolts 23, which extend centrally through the same adjacent to the hub. The reinforcing plate 10 intermediate its ends is provided with a pair of integral tongues 24, which are adapted to engage the opposite sides of the leaves to hold the same in correct position and against any lateral movement in relation to each other. The spokes C are arranged relatively close to one another and the inner end of the reinforcing plate 10 of one spoke terminates within the wings 15 of the other reinforcing plate and engages the outer face of the outer leaf 7.

The rim D includes a plurality of independent sections 25, having formed on the inner surfaces of the central portion thereof spaced lugs 26, between which is adapted to be positioned the eye 18 of the leaf spring 9 of the spoke, and the eye 18 and the lugs 26 are adapted to receive the suitable pivot bolt or pin 27. The meeting terminals of the sections 25 are provided with hinge barrels 28 for the reception of pins or hinge bolts 29, which form means for hingedly connecting the sections together. As clearly shown in Fig. 1 of the drawings, each of the spokes carries one of the rim sections, and forms means for holding the rim in its concentric relation to the hub B. Each section 25 of the rim is provided with outwardly extending inwardly inclined flanges 30, which are formed on the side and end walls thereof, and these flanges are adapted to form houses or cups for the reception of the sections of the tire E. The tire E includes a plurality of independent solid rubber sections 31, which have their bases 32 enlarged, and provided with inclined side and end faces 33, which are adapted to fit into the cup or housing formed by the flanges 30.

In applying the sections 31 of the tire E into position, the same are flexed, as shown in Fig. 4 of the drawing, and the terminals of the enlarged bases inserted in the housing or cup and the central portion of the sections are then forced inwardly which forces the terminals of the sections outwardly and thus firmly binds the same in position. To prevent accidental displacement of the sections 31 by the bulging outwardly of the central portion thereof, a retaining bolt 35 is extended into registering openings 36 and 37 formed in the tire sections and the side flanges of the rim sections 25.

From the foregoing description it can be seen that an improved resilient vehicle wheel is provided in which the spokes thereof are so constructed as to obviate the necessity of employing cushion tires, and which have substantially twice the cushioning qualities of the ordinary pneumatic tire, owing to the length and the range of the same in relation to the hub and rim.

In applying the wheels to a vehicle the same are arranged so that the spokes of the front and rear sets of wheels will extend in a reverse direction in relation to each other. Fig. 1 represents the direction of the spokes for a wheel, which is to be used on the rear axle, assuming that the wheel rotates in a counter-clockwise direction.

It is essential that the rear or drive wheels be placed on the vehicle as described, so that the driving force will have a tendency to flex or bend the springs forming the spokes, in the same direction as their curvature, and thereby assuring the maximum cushioning benefit being obtained therefrom. If the drive wheels were rotated in a clockwise direction, when positioned, as shown in Fig. 1, the driving force would have a tendency to straighten the springs forming the spokes and of distorting the same and thereby prevent the maximum efficiency being obtained therefrom.

As the front wheels are rotated by their contact with the ground, it is desirable (although not necessary) that the springs forming the spokes be positioned in a reverse direction from that shown in Fig. 1, as heretobefore described, so that the same will flex in the direction of the bend and thereby prevent the straightening of the springs or spokes.

Changes in details may be made without departing from the spirit or scope of my invention; but,

I claim:

1. In a vehicle wheel, a hub, a rim, a plurality of resilient connecting spokes, each of the spokes including a plurality of spring leaves and a reinforcing plate, the inner end of the reinforcing plate being curved arcuately and provided with an attaching foot, means rigidly securing the attaching foot of the reinforcing plate to the hub, wings formed on the side edges of the reinforcing plate adjacent to the end thereof arranged to engage the hub, the inner ends of the spring leaves being received between said wings, one of said leaves being formed relatively long and pivotally secured to the rim.

2. In a vehicle wheel, a hub, a rim, a plurality of resilient connecting spokes, each of the spokes including a plurality of spring leaves and a reinforcing plate, the inner end of the reinforcing plate being provided with inwardly extending wings arranged to engage the hub, means rigidly securing the inner end of the reinforcing plate to the hub, one of said leaves being formed relatively long and having its inner end positioned between the wings in spaced relation to the hub, and having its outer end pivotally secured to the rim, another one of said leaves having its inner end extended between the wings of the reinforcing plate engaging the hub, said last mentioned leaf, hub, reinforcing plate and wings forming an oil pocket, the meeting faces of the leaves and reinforcing plate having oil grooves formed therein communicating with said pocket.

3. In a resilient vehicle wheel, a hub, a rim, a plurality of resilient connecting spokes, each of the spokes including a plurality of spring leaves, and a reinforcing plate, the reinforcing plate being secured to the hub and arranged in tangential relation thereto, the spring leaves being secured to the reinforcing plate, one of the spring leaves being formed relatively long and extended beyond the reinforcing plate and the other spring leaves, and means securing the outer end of the relatively long spring leaf to the rim.

EARL AMOS DE BAUN.